US006718050B1

(12) United States Patent
Yamamoto

(10) Patent No.: US 6,718,050 B1
(45) Date of Patent: Apr. 6, 2004

(54) FACE-IMAGE PROCESSING APPARATUS

(75) Inventor: Takayuki Yamamoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/444,577

(22) Filed: Nov. 19, 1999

(30) Foreign Application Priority Data

May 24, 1999 (JP) .......................................... 11-142721

(51) Int. Cl.[7] .................................................. G06K 9/00
(52) U.S. Cl. ...................................... 382/117; 382/118
(58) Field of Search ................................. 382/117, 118, 382/103, 171, 173, 203; 348/78

(56) References Cited

U.S. PATENT DOCUMENTS

| 5,293,427 A | * | 3/1994 | Ueno et al. ............... 382/103 |
| 5,471,542 A | * | 11/1995 | Ragland .................. 351/208 |
| 5,859,921 A | * | 1/1999 | Suzuki ..................... 382/118 |
| 5,878,156 A | * | 3/1999 | Okumura ................... 340/575 |
| 6,072,892 A | * | 6/2000 | Kim ......................... 382/117 |

FOREIGN PATENT DOCUMENTS

| JP | 6-348980 | 12/1994 | .......... G08B/21/00 |
| JP | 8-175218 | 7/1996 | .......... G60K/28/06 |
| JP | 9-198508 | 7/1997 | ............ G06T/7/00 |

* cited by examiner

Primary Examiner—Amelia M. Au
Assistant Examiner—Colin LaRose
(74) Attorney, Agent, or Firm—Sughrue Mion, PLLC

(57) ABSTRACT

A multivalue image of the face input by a CCD camera 2 is stored in a multivalue-image memory 3. A multivalue-image characteristic extracting means 23 extracts a pixel of interest from the stored multivalue face image in accordance with distribution of relative brightness of the brightness of the pixel of interest and those of pixels adjacent to the pixel of interest. The extracted pixel of interest is stored in a binarized-image memory 5. The stored pixel of interest is used to extract an eye region. In accordance with the extracted eye region, an opening/closing determining means 7 determines opening/closing of the eyes.

7 Claims, 12 Drawing Sheets

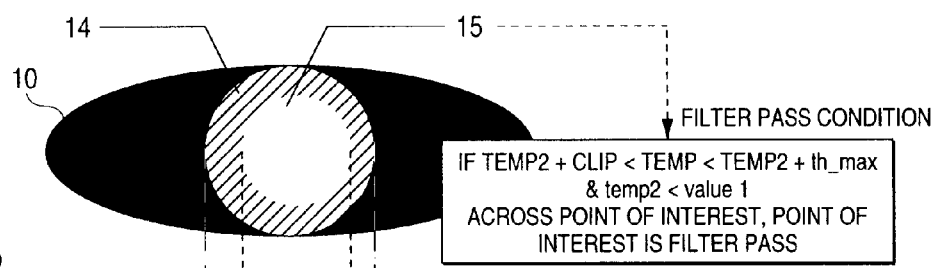
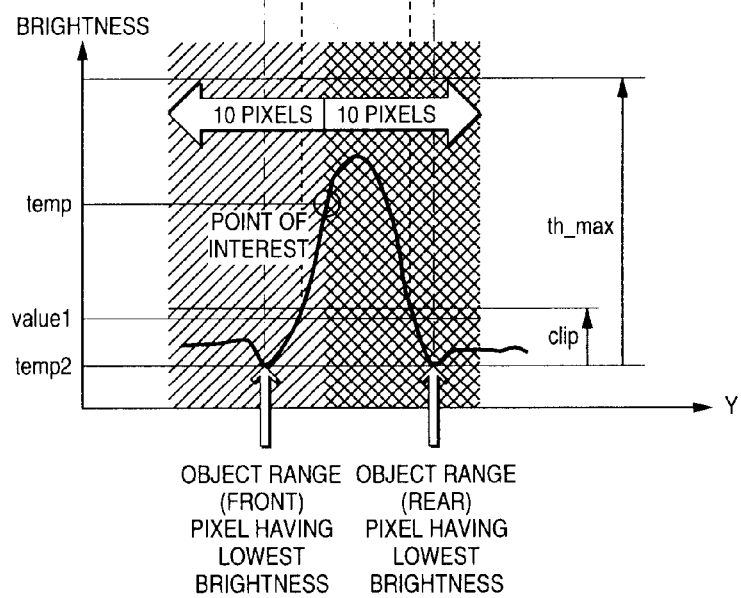

10: IMAGE REFLECTED BY RETINA

11: BINARIZED REGION OF IMAGE REFLECTED BY RETINA

FACE-IMAGE PROCESSING APPARATUS

BACKGROUND OF THE INVENTION

The present invention relates to a face-image processing apparatus for determining opening/closing of the eyes in accordance with the multivalue face image of a person to be detected.

As a conventional face-image processing apparatus incorporating an illuminating means for irradiating the face of a person to be detected, an apparatus disclosed in the Unexamined Japanese Patent Application Publication No. Hei.9-198508 has been known.

FIG. 7 is a schematic view showing the structure of an conventional eye-state detecting apparatus disclosed in the Unexamined Japanese Patent Application Publication No. Hei.9-198508.

Referring to FIG. 7, reference numeral 1 represents a person to be detected, 2 represents a CCD camera for photographing the person 1 to be detected and 3 represents a multivalue image memory for storing the image photographed by the camera 2. Reference numeral 4 represents a binarizing means for binarizing the multivalue image, 5 represents a binarized-image memory for storing the binarized image, 6 represents a binarized-image characteristic extracting means for extracting the characteristic from the binarized image and 7 represents an opening/closing determining means for determining opening/closing of the eyes in accordance with the characteristic of the binarized image. Reference numeral 8 represents an LED light source and 9 represents an LED operating circuit for passing an electric current to the LED light source 8.

FIGS. 8A and 8B show multivalue image of the face of a person to be detected and a binarized image reflected by the retina obtained by the apparatus disclosed in the Unexamined Japanese Patent Application Publication No. Hei.9-198508. FIG. 8A shows the multivalue image. FIG. 8B shows the binarized image.

Referring to FIGS. 8A and 8B, reference numeral 10 represents the multivalue image, 11 represents the binarized image, 14 represents the image reflected by the retina and 15 represents a binarized region of the image reflected by the retina.

When the face of the person 1 to be detected is photographed by the foregoing conventional face-image processing apparatus, the pupils of the person 1 to be detected are photographed as if the pupils glow owning to light reflected by the retinas of the eyeballs, as shown in FIG. 8A. The reason for this lies in that the retinas have a characteristic which returns reflected light in the same direction as the direction of the incident light. The image 14 reflected by the retina is photographed with considerably intense brightness as compared with the other portions of the face. Therefore, a process for binarizing the overall portion of the photographed multivalue image enables a region having the intense brightness as shown in FIG. 8B to be extracted as a pupil region. In accordance with a fact whether or not the pupil region exists, that is, whether or not the binarized region 15 of the image reflected by the retina exists, the opening/closing state of the eyes is determined.

FIG. 9 shows a flow chart of an algorithm employed by the face-image processing apparatus disclosed in the Unexamined Japanese Patent Application Publication No. Hei.9-198508 for extracting the eyes.

An image of the face photographed in step S1 is stored in the multivalue-image memory for one frame in step S2. A binarizing process is performed in step S3 so that a multivalue image captured in step S2 and output from the binarized-image memory is binarized by using a threshold value for binarization. A result of the binarizing process performed in step S3 is stored in the binarized-image memory for one frame in step S4. In step S5 an eye-candidate binarized region setting process is performed so that an eye candidate region is set from the binarized regions output from the binarized-image memory. In step S6 the binarized eye region is selected from the eye candidate region set in step S5. If the binarized eye region is selected in step S6, opening/closing is determined in step S7 such that an image reflected by the retina exists. That is, a determination is made that the eyes are opened. If the binarized eye region is not selected in step S6, opening/closing is determined in step S7 such that no image reflected by the retina exists. That is, the eyes are closed.

As a conventional face-image processing apparatus using a template, an apparatus disclosed in, for example, the Unexamined Japanese Patent Application Publication No. Hei.8-175218 is known. According to the foregoing disclosure, a driving state detecting apparatus has been disclosed which incorporates a template producing means for vertically and laterally moving a predetermined standard face template with respect to the photographed image to perform correlation calculations so as to produce an object template for the person to be detected; and an eye-region detecting means for detecting the eye region of the person to be detected by performing correlation calculations by using the object template.

FIG. 10 is a schematic view showing the structure of the driving state detecting apparatus disclosed in the Unexamined Japanese Patent Application Publication No. Hei.8-175218.

An image processing apparatus 17 is connected to a camera 2 for photographing a person 1 to be detected. An image of the face of the person 1 to be detected is supplied to the image processing apparatus 17. The image processing apparatus 17 incorporates an A/D converter, a normalizing circuit and a correlation calculating circuit so as to convert the supplied image signal into a digital signal, followed by performing a process for normalizing light and shade. A memory 18 is connected to the image processing apparatus 17. A standard template and layout data of elements of the face including the eyes and eyebrows are previously stored in the memory 18. Moreover, an electronic control unit ,i.e., ECU 19 is connected to the image processing apparatus 17 so that a result of the process is supplied to the ECU 19. The ECU 19 determines a state of driving of the person 1 to be detected in accordance with the result of the process. Thus, the ECU 19 outputs a control signal to an alarm unit 20 so that an alarm is issued.

As a conventional face-image processing apparatus using distribution of brightness, an apparatus disclosed in, for example, the Unexamined Japanese Patent Application Publication No. Hei.6-348980 is known. The foregoing apparatus is an apparatus which is capable of monitoring the eyes of a driver in a vehicle and structured to specify the positions of the eyes by paying attention to a fact that the black eye portions are the darkest portions in the frame. An average value of maximum and minimum brightness in the vicinity of the darkest point is used as the threshold value of the brightness so as to extract the eye region.

Specifically, a plurality of sampling points are determined at the positions of the eyes on the frame, and then each sampling point is shifted to the dark portion. In accordance with the sampling points converged to the black eye portions, the position of the eyes are specified. In accordance with the distribution of the brightness of the adjacent portions, the eye regions are extracted.

FIG. 11 is a diagram showing a process for extracting the eye regions which is performed by the apparatus disclosed in the Unexamined Japanese Patent Application Publication No. Hei.6-348980 and which uses the distribution of the brightness so as to monitor the eyes of the driver in the vehicle.

FIG. 11 shows a method with which mean brightness T_av of maximum brightness T (max) of portions adjacent to the eye and minimum brightness T (min) of the same is used as a threshold value so as to extract a black eye portion so that the width W of the eye is obtained.

The conventional apparatus which detects the state of the eyes by using an image reflected by the retinas incorporates the binarized-image characteristic extracting means 6 which binarizes a multivalue image so that the image process is performed. Therefore, information about the light and shade of the multivalue image has been abolished. Hence it follows that extraction of images reflected by the retinas requires control of the threshold value for the binarization in accordance with the brightness of the photographed image of the face of the person to be detected. The result of the extraction of the characteristic greatly depends on the foregoing threshold value for the binarization.

FIGS. 12A and 12B show conventional binarized image of the person to be detected including an image reflected by the retina. FIG. 12A shows a result of binarization of only the image reflected by the retina. FIG. 12B shows an image of a binarized image including noise.

Referring to FIGS. 12A and 12B, reference numerals 11 and 15 represent the same elements as those shown in FIGS. 8A and 8B. Reference numeral 21 represents noise.

FIG. 13 shows the distance between the two eyes and the levelness of a multivalue image of the face of a person to be detected by the conventional apparatus.

Referring to FIG. 13, reference numerals 1 and 10 represent the same elements as those shown in FIGS. 8A and 8B.

For example, the overall pupils of the multivalue image of the face are binarized with a general threshold for the binarization. Therefore, if a dark image is reflected by the retina or if the overall portion of the fame is a bright image, that is, if the image has low contrast, extraction of the image reflected by the retina as a binarized region has sometimes been inhibited.

It is preferable that the binarized image is processed such that only the image reflected by the retina is extracted as the binarized region, as shown in FIG. 12A. If a region having a brightness band which is the same as that of the image reflected by the retina exists, the region, however, is binarized similarly to the image reflected by the retina. Thus, the region is left as noise 21, as shown in FIG. 12B. As a result, the extraction of the image reflected by the retina from a plurality of the binarized regions must be performed in accordance with relative positional relationships including the distance and levelness with which the conditions for the two eyes are satisfied. If the face is inclined, the levelness of the foregoing positional relationships cannot be satisfied, as shown in FIG. 13. As a result, an error extraction is caused.

If the face is moved vertically, the positional relationship between the eyes and the eyebrows is not changed. Therefore, when regions adjacent to the eyes have been detected by using the regions adjacent to the object eyes, the conventional apparatus for detecting a state of driving using the template is able to reliably specify the eye region such that upper black portions are determined as the eyebrows and the lower black portions are determined as the eyes. When the movement of the face is factored in, matching of the template must be performed by scanning a large area of the image. As a result, time required to complete the process of calculating correlation cannot be shortened.

The conventional apparatus for monitoring the eyes of a driver in a vehicle arranged to use distribution of brightness is able to perform extraction of the eye regions such that the eye region can reliably be included in the sampling point of the darkest point. Therefore, a multiplicity of the sampling points must be provided. As a result, black regions, such as eyebrows and hairs, are included. Since the multiplicity of the points of interest are processed, time required to complete the process cannot be shortened.

To shorten time required to complete the process, a temperature measuring device TMD has been employed as a means for limiting the face image region of the person to be detected. Hence it follows that the structure of the system becomes too complicated and the cost cannot be reduced.

SUMMARY OF THE INVENTION

In view of the foregoing, an object of the present invention is to provide a face-image processing apparatus which is capable of reliably determining opening/closing of the eyes.

A face-image processing apparatus according to the present invention comprises: image input means for inputting a multivalue face image which is expressed by a multiplicity of pixels disposed in a matrix configuration; multivalue-image characteristic extracting means for extracting a binarized eye region from the multivalue face image input by the image input means; and opening/closing determining means for determining opening/closing of the eyes in accordance with the eye region extracted by the multivalue-image characteristic extracting means.

The apparatus comprises: image input means for inputting a multivalue face image which is expressed by a multiplicity of pixels disposed in a matrix configuration; multivalue-image characteristic extracting means for extracting an eye region from the multivalue face image input by the image input means; and opening/closing determining means for determining opening/closing of the eyes in accordance with the eye region extracted by the multivalue-image characteristic extracting means.

The multivalue-image characteristic extracting means extracts a pixel of interest in accordance with distribution of relative brightness of the brightness of the pixel of interest contained in the multivalue face image and the brightness of pixels adjacent to the pixel of interest so as to extract an eye region by using the extracted pixel of interest.

The apparatus further comprises extracted-image storing means for storing the extracted pixel of interest, wherein the extraction of the eye region is performed by the multivalue-image characteristic extracting means by using the pixel of interest stored in the extracted-image storing means.

The extraction of the pixel of interest is performed by the multivalue-image characteristic extracting means in accordance with distribution of relative brightness in one direction.

The extraction of the pixel of interest in accordance with the distribution of the relative brightness is performed by dedicated hardware.

The distribution of the relative brightness in one direction is in the horizontal direction of the face.

The extraction of the pixel of interest in accordance with the distribution of the relative brightness is performed by dedicated hardware.

The eye region includes an image reflected by the retina.

BRIEF DESCRIPTION OF THE DRAWINGS

FIGS. 3A and 3B are diagrams showing a one-dimensional filter process which is performed by the face-image processing apparatus according to the first embodiment of the present invention.

DETAILED DESCRIPTION OF THE PREFERRED EMBODIMENTS

Embodiments of the present invention will now be described with reference to the drawings.

First Embodiment

Figure 1:
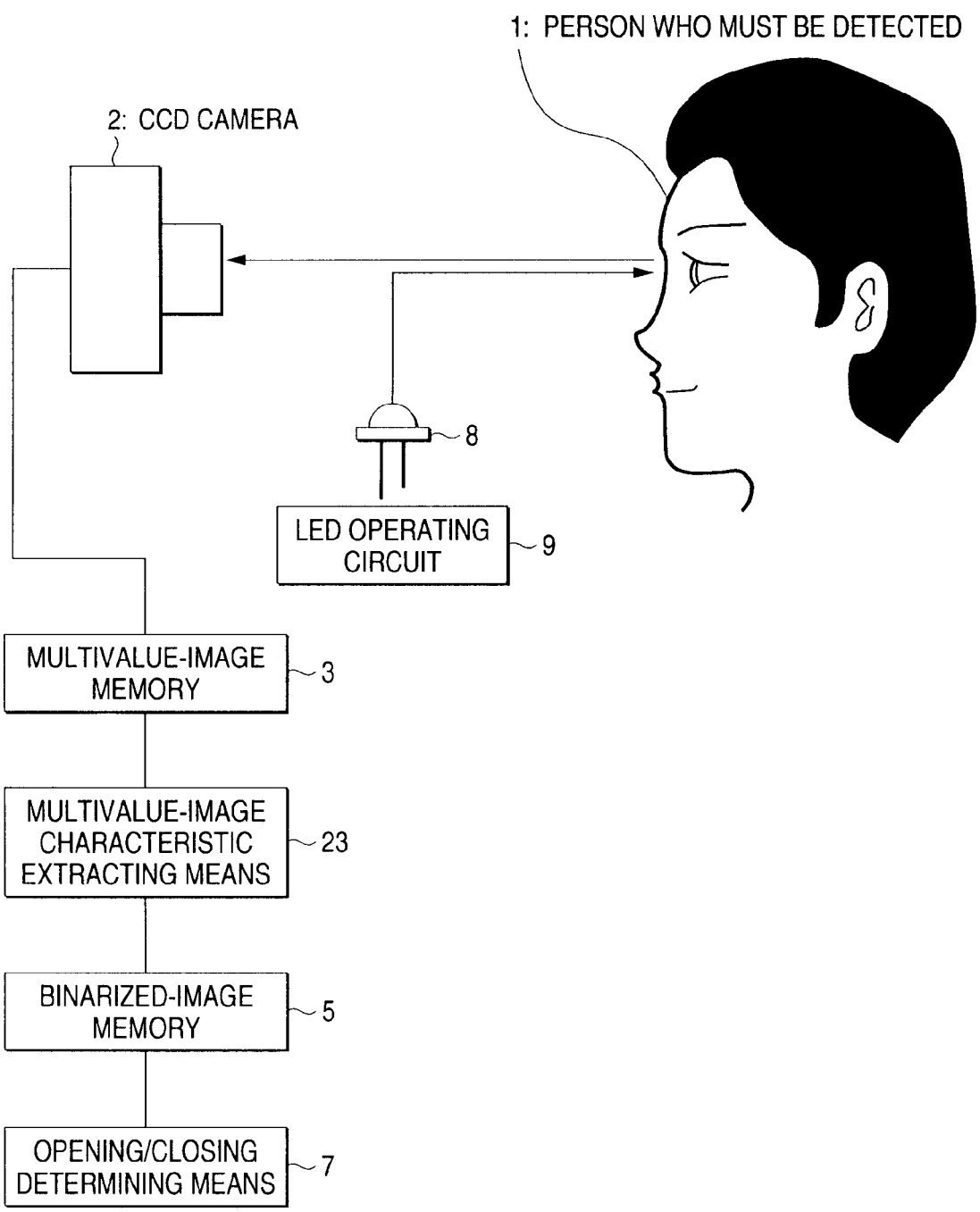
FIG. 1 is a schematic view showing the structure of a face-image processing apparatus according to a first embodiment of the present invention.

FIG. 1 is a schematic view showing the structure of a face-image processing apparatus according to a first embodiment of the present invention.

Referring to FIG. 1, reference numeral 1 represents a person to be detected. Reference numeral 2 represents a CCD camera serving as a photographing means or an image input means for photographing the image of the face of the person to be detected to input the image of the face so structured as to be displayed with a multiplicity of pixels disposed in a matrix configuration. Reference numeral 3 represents a multivalue-image memory for temporarily storing a multivalue image output from the CCD camera 2. Reference numeral 5 represents a binarized image memory for constituting an extracted image storing means for temporarily storing the extracted binarized image. Reference numeral 7 represents an opening/closing determining means which uses the binarized image in the binarized image memory 5 to determine opening/closing of the eyes in accordance with a fact whether or not binarized eye region exists. Reference numeral 8 represents an LED light source and 9 represents an LED operating means for passing an electric current to the LED light source 8. The foregoing elements constitute an illuminating means. Reference numeral 23 represents a multivalue-image characteristic extracting means for extracting the eye region from the multivalue image by using distribution of relative brightness. A result of the extraction of the characteristic of the multivalue image is stored in the binarized image memory 5. The multivalue-image characteristic extracting means 23 and the opening/closing determining means 7 are realized by software which is executed by a microcomputer or the like.

Figure 2:
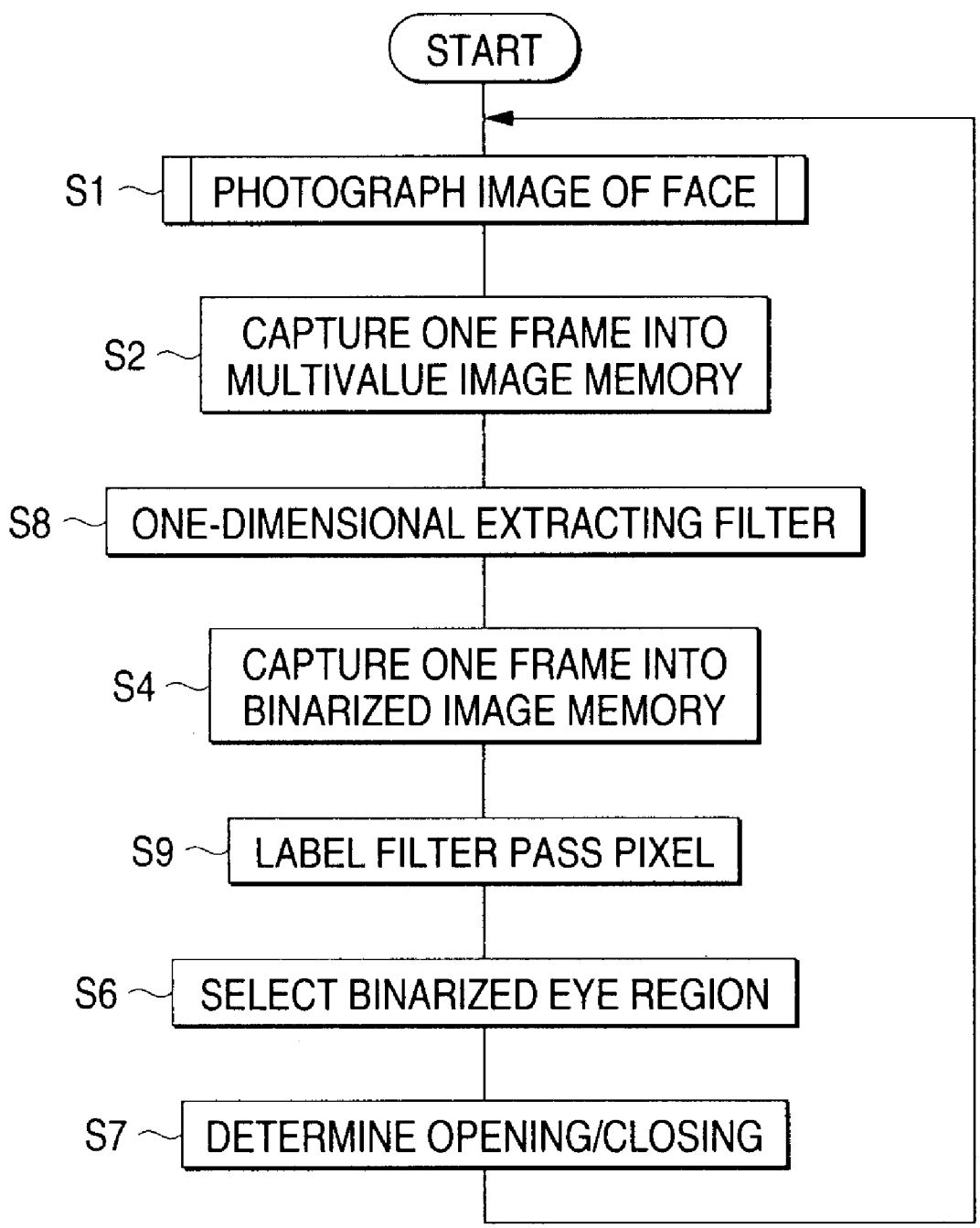
FIG. 2 is a flow chart showing an algorithm employed by the face-image processing apparatus according to the first embodiment of the present invention for extracting the eyes.

FIG. 2 is a flow chart of an algorithm employed by the face-image processing apparatus according to the first embodiment of the present invention and capable of extracting an eye region.

FIG. 2 shows a process different from that of the conventional apparatus in that a one-dimensional extracting filter is used to select an eye region from a multivalue image in accordance with the distribution of relative brightness between the brightness of a pixel of interest and pixels across the pixel of interest so as to extract a binarized eye region.

FIGS. 3A and 3B are diagrams showing a one-dimensional filter process which is performed by the face-image processing apparatus according to the first embodiment of the present invention. FIG. 3A shows an original image. FIG. 3B is a diagram showing distribution of brightness of the original image.

Figure 8A:
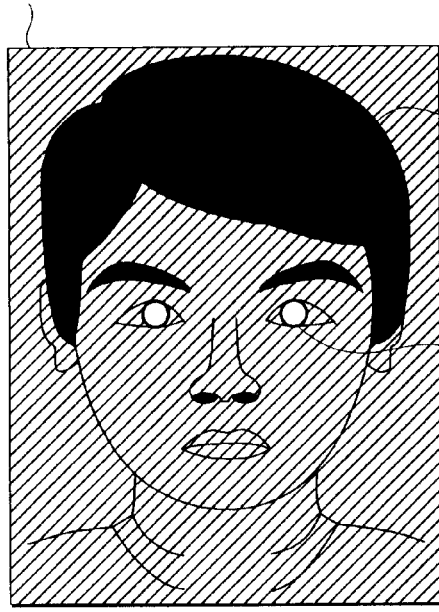
FIGS. 8A and 8B are diagrams showing a conventional multivalue image of the face of a person to be detected and a binarized image of an image reflected by the retina.
Figure 8B:
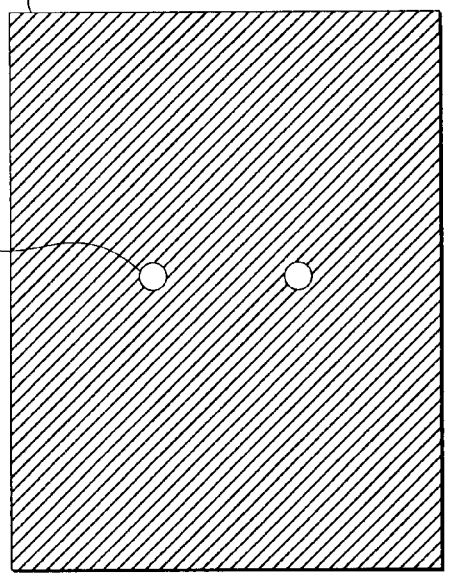
Figure 9:
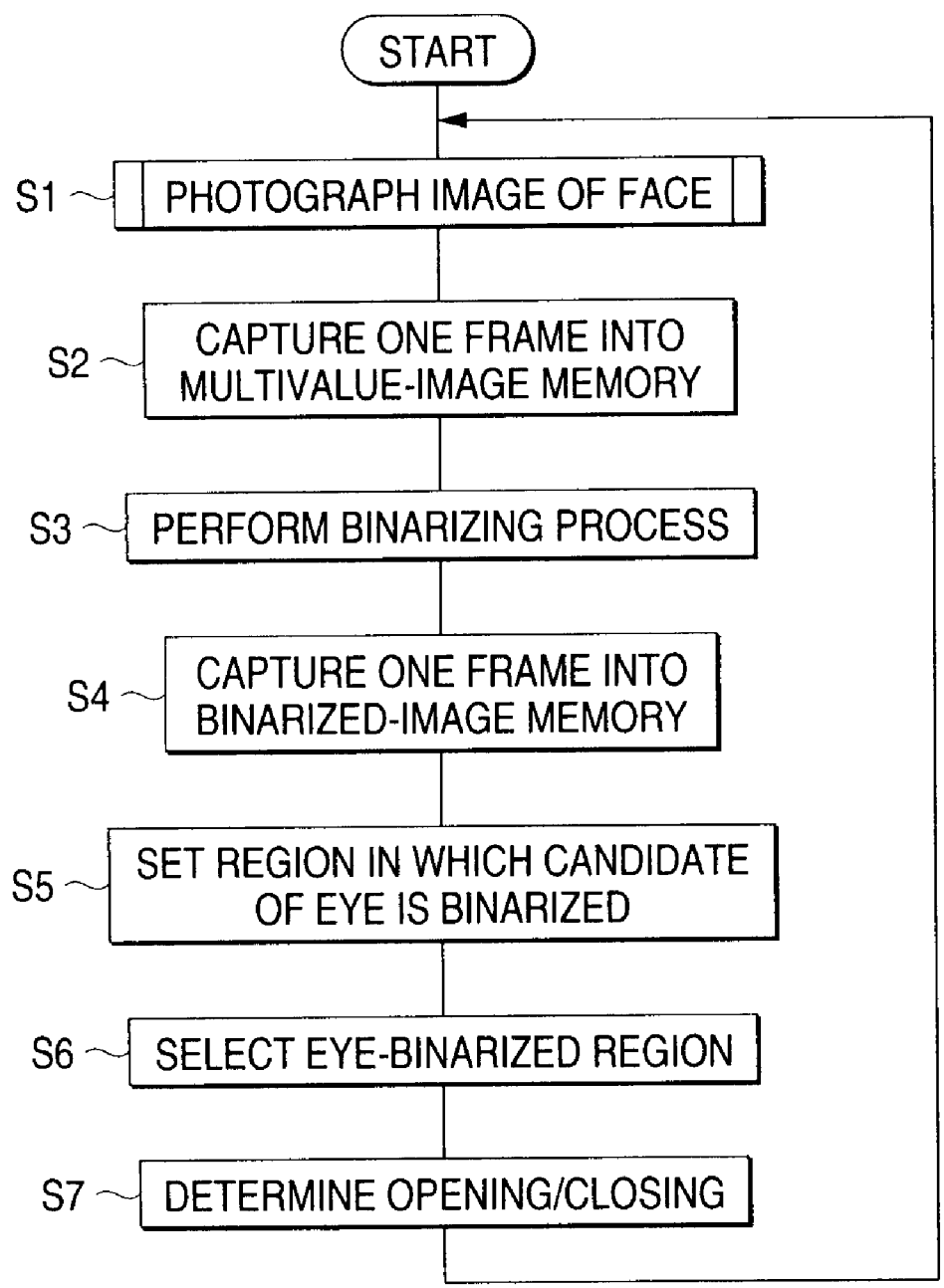
FIG. 9 is a flowchart showing an algorithm for extracting the eyes employed by the conventional face-image processing apparatus.
Figure 10:
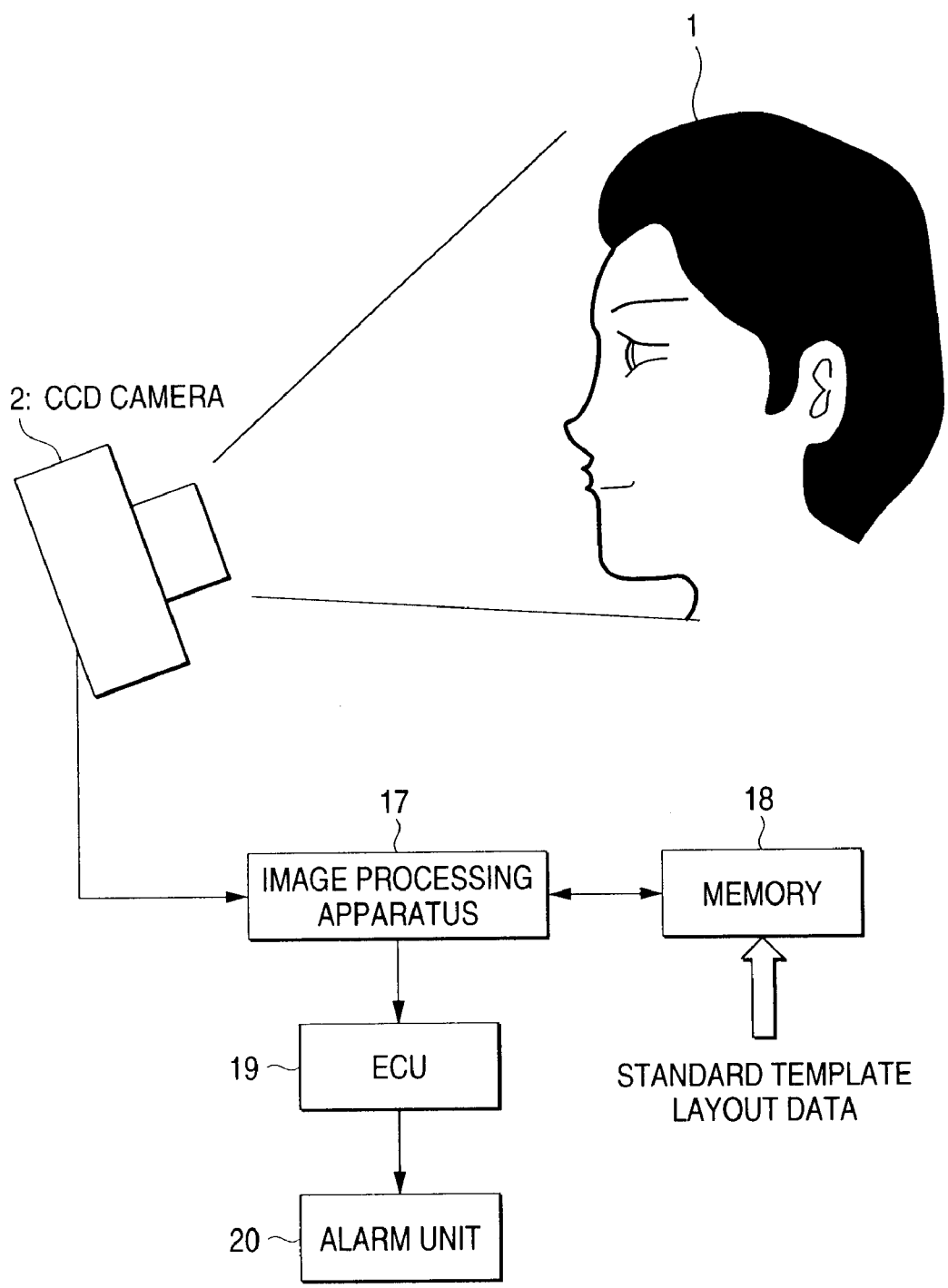
FIG. 10 is a schematic view showing a conventional apparatus for detecting a driving state which performs matching of a template.
Figure 11:
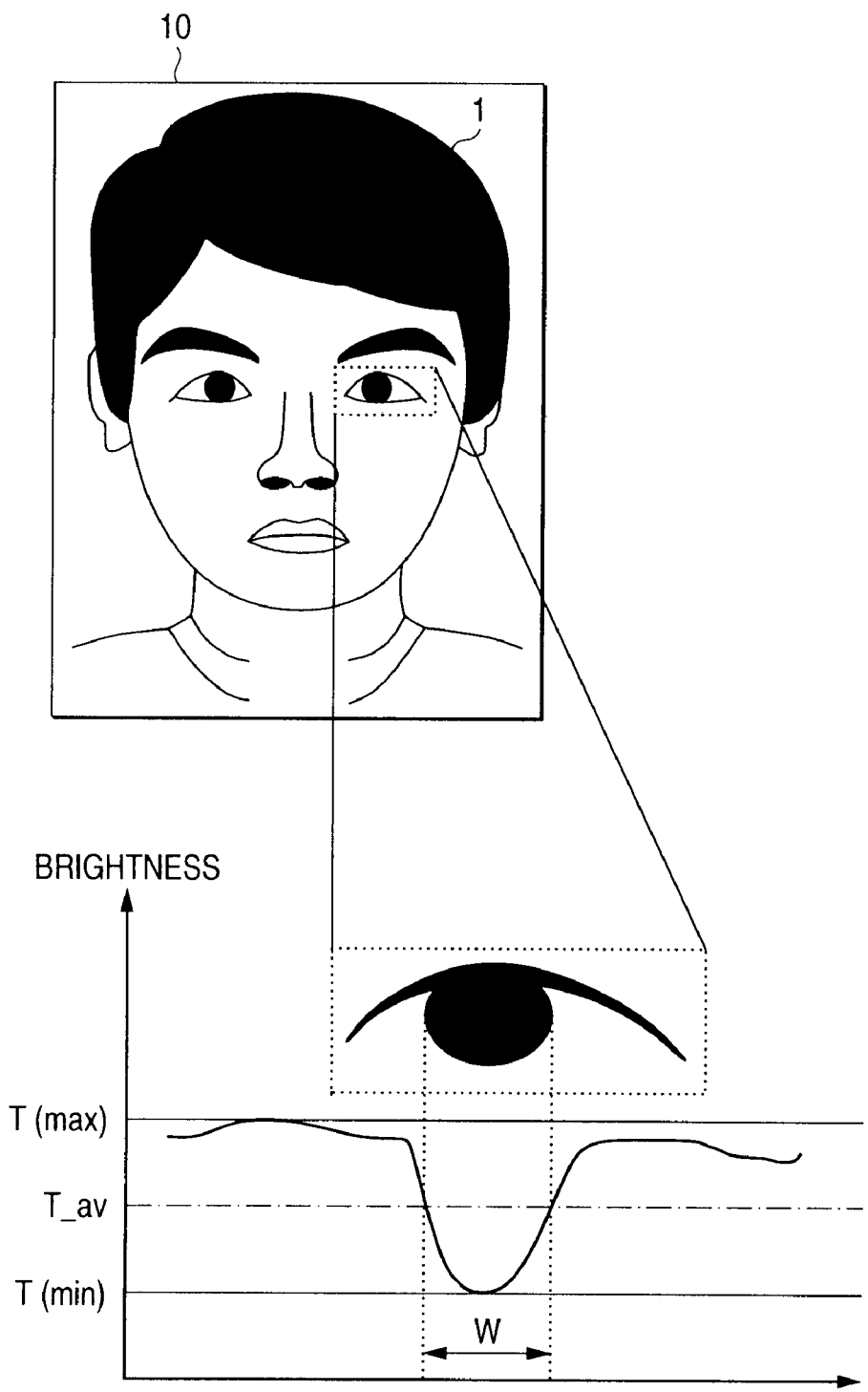
FIG. 11 is a diagram showing extraction of the eyes which is performed by an apparatus for monitoring the eyes of a driver in a vehicle such that distribution of brightness is used.
Figure 12A:
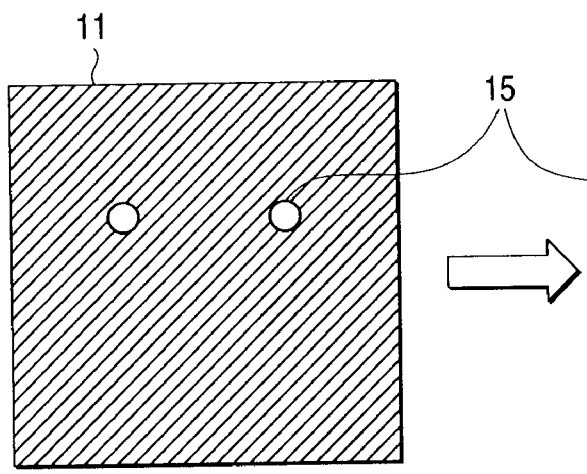
FIGS. 12A and 12B are diagrams showing a conventional binarized image including an image reflected by the retina of a person to be detected.
Figure 12B:
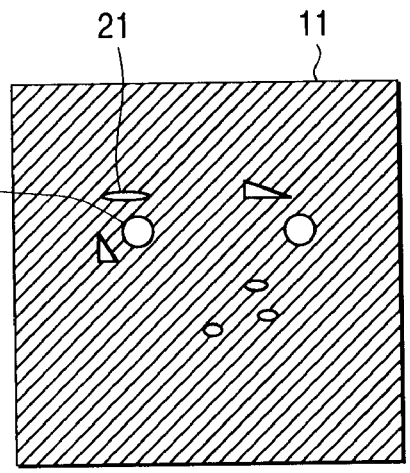
Figure 13:
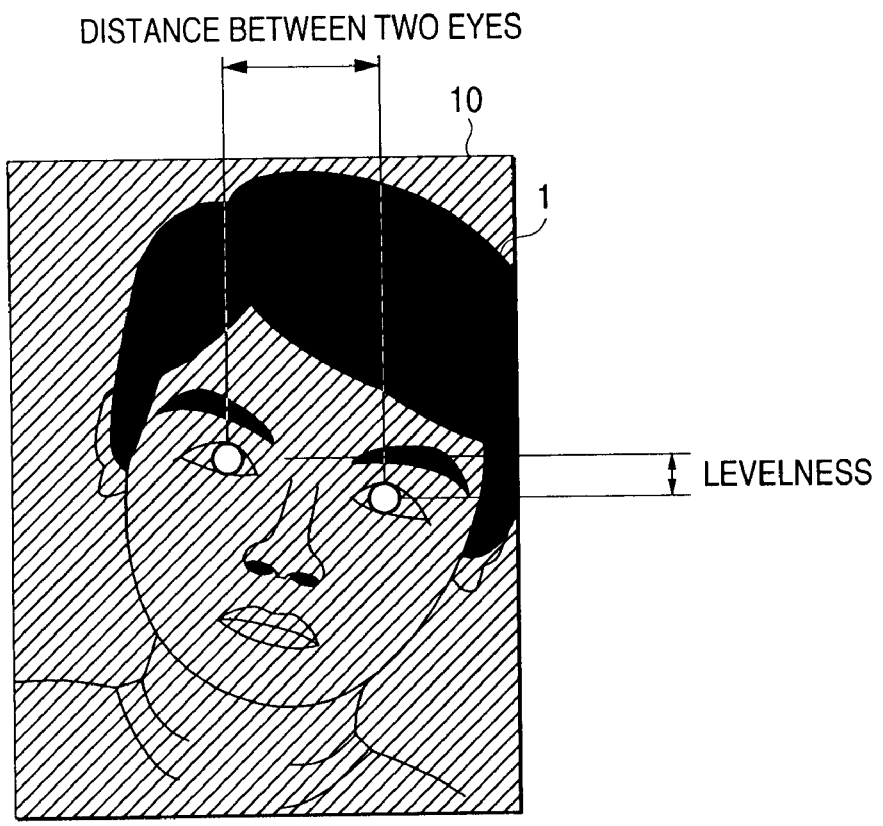
FIG. 13 is a diagram showing the distance between two eyes and levelness of a conventional multivalue image of the face of a person to be detected.

Referring to the drawings, reference numerals 10, 14 and 15 represent the same elements as those shown in FIGS. 8A and 8B.

Figure 4:
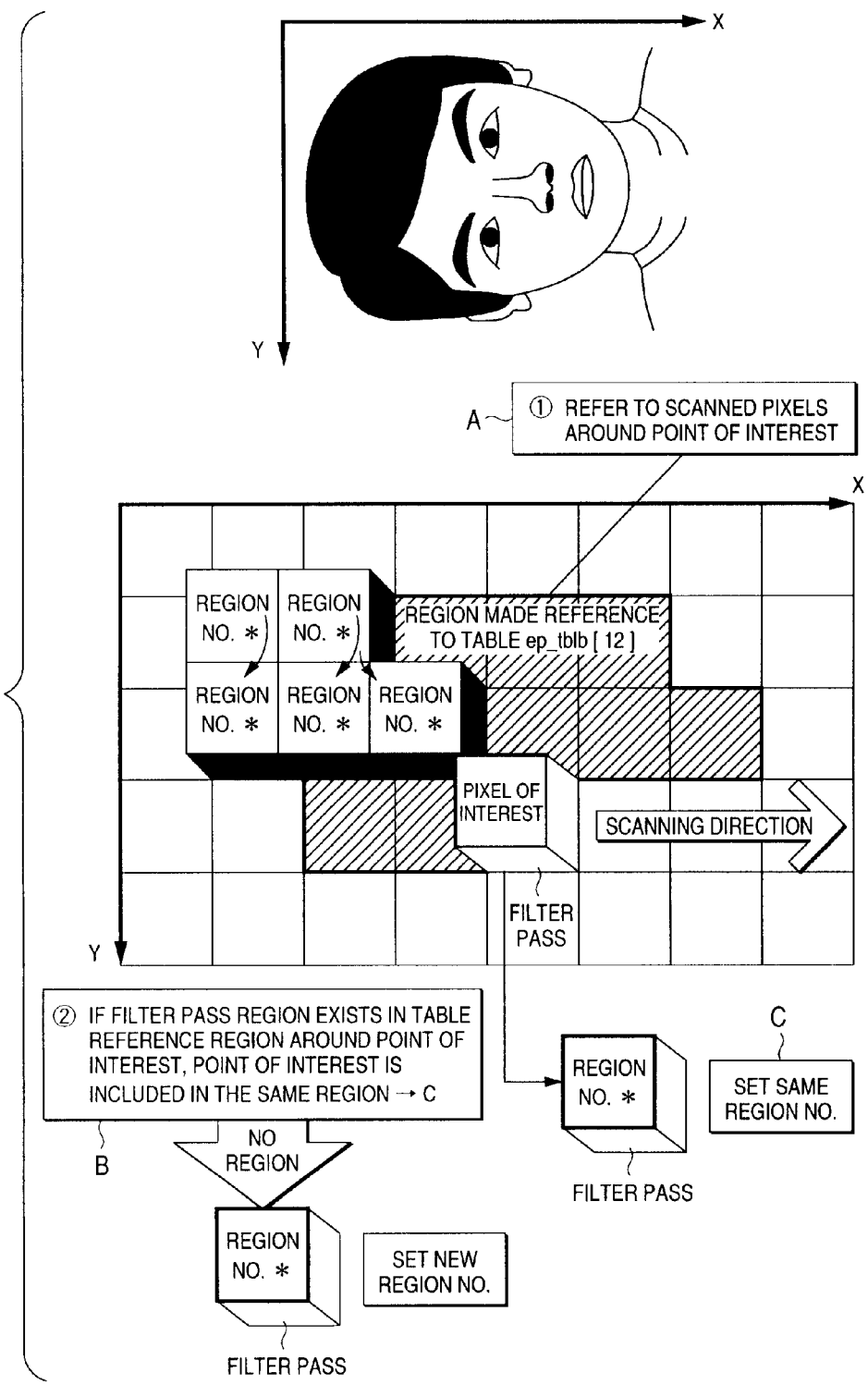
FIG. 4 is a diagram showing labeling of a filter pass pixel which is performed by the face-image processing apparatus according to the first embodiment of the present invention.

FIG. 4 is a diagram showing labeling of filter pass pixel which is performed by the face-image processing apparatus according to the first embodiment of the present invention.

A method of extracting an eye region from the multivalue image of the face by using the multivalue-image characteristic extracting means 23 will now be described with reference to FIG. 2.

A process in step S1 for photographing an image of the face and a process in step S2 for capturing the multivalue image into the memory are performed similarly to those of the conventional structure.

A multivalue image captured in step S2 and output from the multivalue image memory is filtered by the one-dimensional extracting filter in step S8. Thus, an eye region, that is, a region in which an image reflected by the retina has been binarized, is extracted. FIGS. 3A and 3B show pixel extracted by the one-dimensional filter in step S8.

The original image in the vicinity of the image reflected by the retina is, as shown in FIG. 3A, formed such that the image reflected by the retina is made to be a white and bright portion and an annular pupil portion surrounding the image reflected by the retina is made to be a darkest portion. The white portion is darkened conversely to an actual state.

Therefore, the brightness is distributed as shown in FIG. 3B such that the central portion of the image reflected by the retina has the highest brightness and the pupil portion has the lowest brightness.

Referring to FIG. 3B, when a points of interest is indicated with mark O, each 10 pixels in front of and in the rear of the pixel of interest in the horizontal direction of the face are included in the object range. Lowest brightness temp 2 is obtained from the object range. In FIG. 3B, temp 2 across the pixel of interest take the same value to simplify the illustration.

Filter pass of the point of interest is permitted under conditions that the brightness temp of the point of interest in ranges across the point of interest satisfies:

temp2+clip<temp<temp2+th__max and temp2<value1 where clip is an offset value for setting a lower limit of the brightness of the point of interest, th__max is an offset value for setting an upper limit of the brightness of the point of interest and value1 is a threshold value for setting an upper limit of the lowest brightness of the object range.

The filter pass conditions are set for the purpose of extracting only the image reflected by the retina by paying attention to a fact that "the image reflected by the retina is bright and the ranges across the image reflected by the retina in the horizontal direction is dark owning to inversion of the brightness of the pupil and the white".

As described above, each of the pixels of interest is scanned so that the one-dimensional filter process is performed. Note that the pixels included in the object range do not concern the filter pass and only a reference is made to the foregoing pixels.

If the point of interest has passed through the filter in step S8 shown in FIG. 2, the brightness of the coordinates of the pixel of the point of interest in the binarized-image memory 5 is rewritten so that a result of the filter process is stored in the binarized-image memory 5. When, for example, all pixels in the binarized-image memory 5 are initialized to have brightness of zero. When the brightness of the pixels allowed to pass through the filter is 255, a reference to the brightness enables a result of the filter process to be obtained. Note that only reference is made to the binarized-image memory 3 on which data of the brightness of the original image has been written from the camera, that is, the image processing apparatus 3 is not rewritten.

Although the result of the filter process is stored in the binarized-image memory 5 as the binarized brightness in this embodiment, the form of the result is not limited to the binary value if the result is stored in the memory. The brightness may be stored as a ternary or quadruple according to the authenticity of the filter pass.

In step S9 the binarized-image memory 5 is scanned so that adjacent filter pass pixels extracted in step S8 are collected into one region which is then labeled. Since an isolated pixel composed of one to two pixels is not set as the region, noise elimination is simultaneously performed.

The labeling process will now be described.

FIG. 4 shows the labeling process. In FIG. 4, X direction indicates the vertical direction of the face and Y direction indicates the horizontal direction of the face. Brightness data in the binarized-image memory 5 is scanned. When the filter pass pixel is hit, a determination is made whether or not a labeled pixel exists in the scanned pixel in the reference region instructed with table ep__tblb [12], as shown in A. If no labeled region exists, new region No. is set to the present pixel of interest as shown in B. If a labeled region exists as illustrated, the same region No. is set as shown in C. In the foregoing case, the lower bit of the brightness is rewritten as the region No. so that the region No. is stored.

Although the table ep__tblb [12] employed in the foregoing process is used to make a reference to 12 pixels adjacent to the pixel of interest, a larger region may be set if the region has been scanned. Note that the joint to adjacent regions is enhanced as the reference range is enlarged, causing the number of regions to be reduced.

A reference is made to the region No. instructed with the lower bit of the brightness in the binarized-image memory 5 in step S6 shown in FIG. 2 in which binarized eye region is selected so that binarized eye region is selected.

In accordance with a fact determined in step S6 whether or not the binarized eye region exists, that is, in accordance with whether or not the image reflected by the retina exists, opening/closing of the eyes is determined in the process in step S7 for determining whether or not the eyes are opened or closed.

In the first embodiment, an image at night is processed by using the image reflected by the retina as the object to be extracted. When the threshold value condition of the brightness of the one-dimensional filter of the multivalue-image characteristic extracting means 23 is inverted to be adaptable to daytime image, a similar process to that for the image of the face at night can be performed for the daytime image of the face.

Second Embodiment

A second embodiment has a structure that the one-dimensional filter process of the multivalue-image characteristic extracting means 23 according to the first embodiment is performed by using dedicated hardware. Thus, lowest brightness in an object range composed of each of 10 pixels in front of and in the rear of the point of interest in the horizontal direction is obtained so as to realize a high-speed algorithm.

Figure 5C:
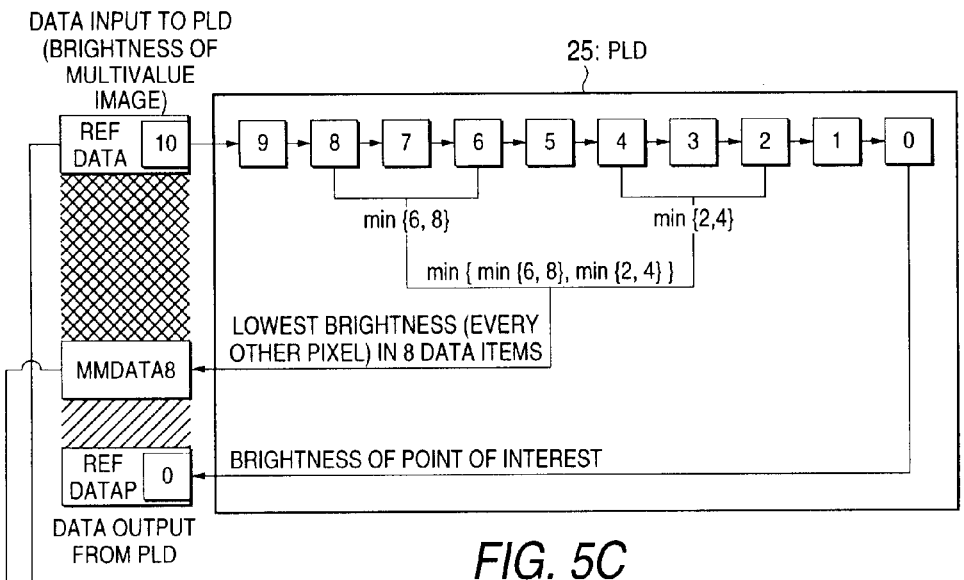
FIGS. 5A to 5C are diagrams showing a filter process of a face-image processing apparatus according to a second embodiment of the present invention.
Figure 5A:
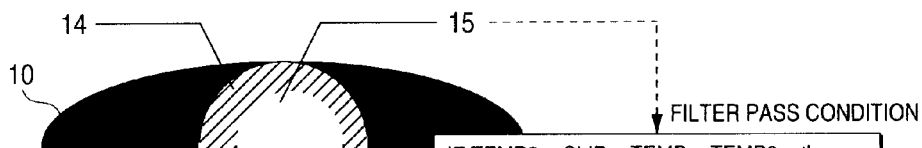
Figure 5B:
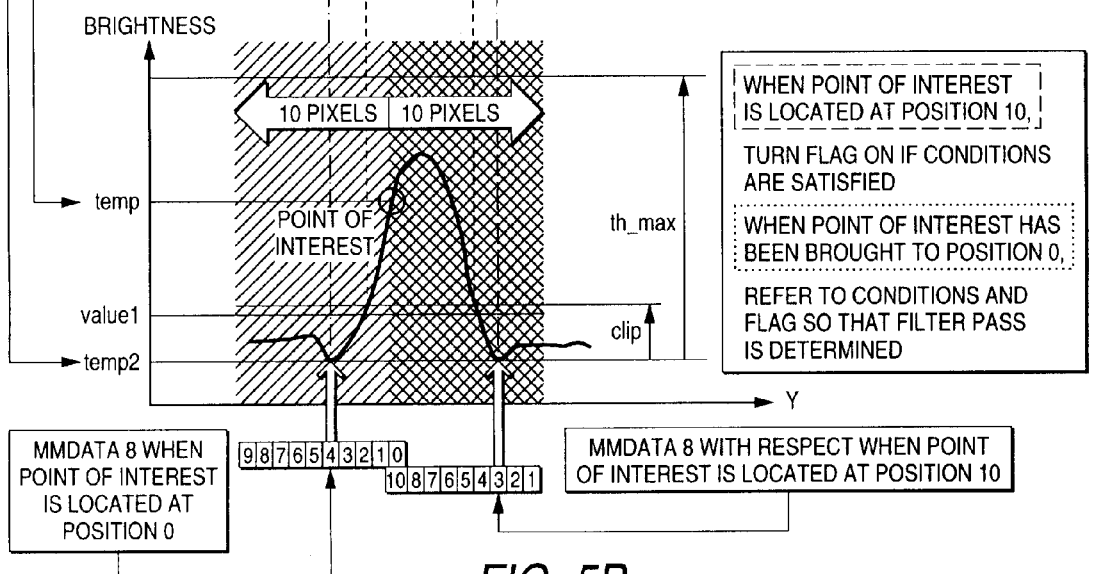

FIGS. 5A to 5C are diagrams showing a filter process of a face-image processing apparatus according to a second embodiment of the present invention. FIG. 5A is a diagram showing an original image, FIG. 5B is a graph showing distribution of brightness of the original image and FIG. 5C is a diagram showing a dedicated hardware PLD.

Referring to FIGS. 5A to 5C, reference numerals 10, 14 and 15 represent the same elements as those shown in FIGS. 3A and 3B. Reference numeral 25 represents a PLD.

Figure 6:
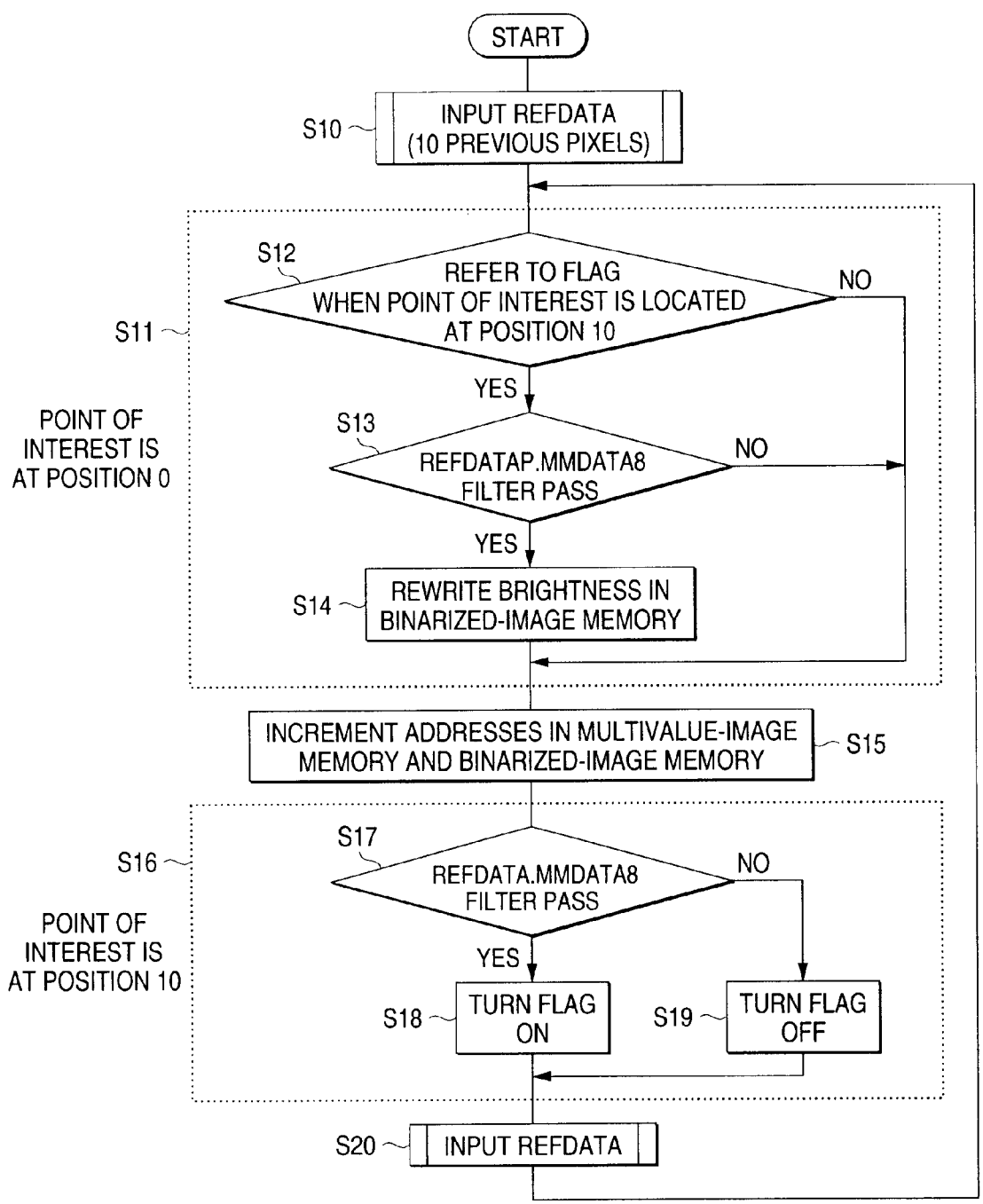
FIG. 6 is a flow chart of an algorithm of the filter process of the face-image processing apparatus according to the second embodiment of the present invention.
Figure 7:
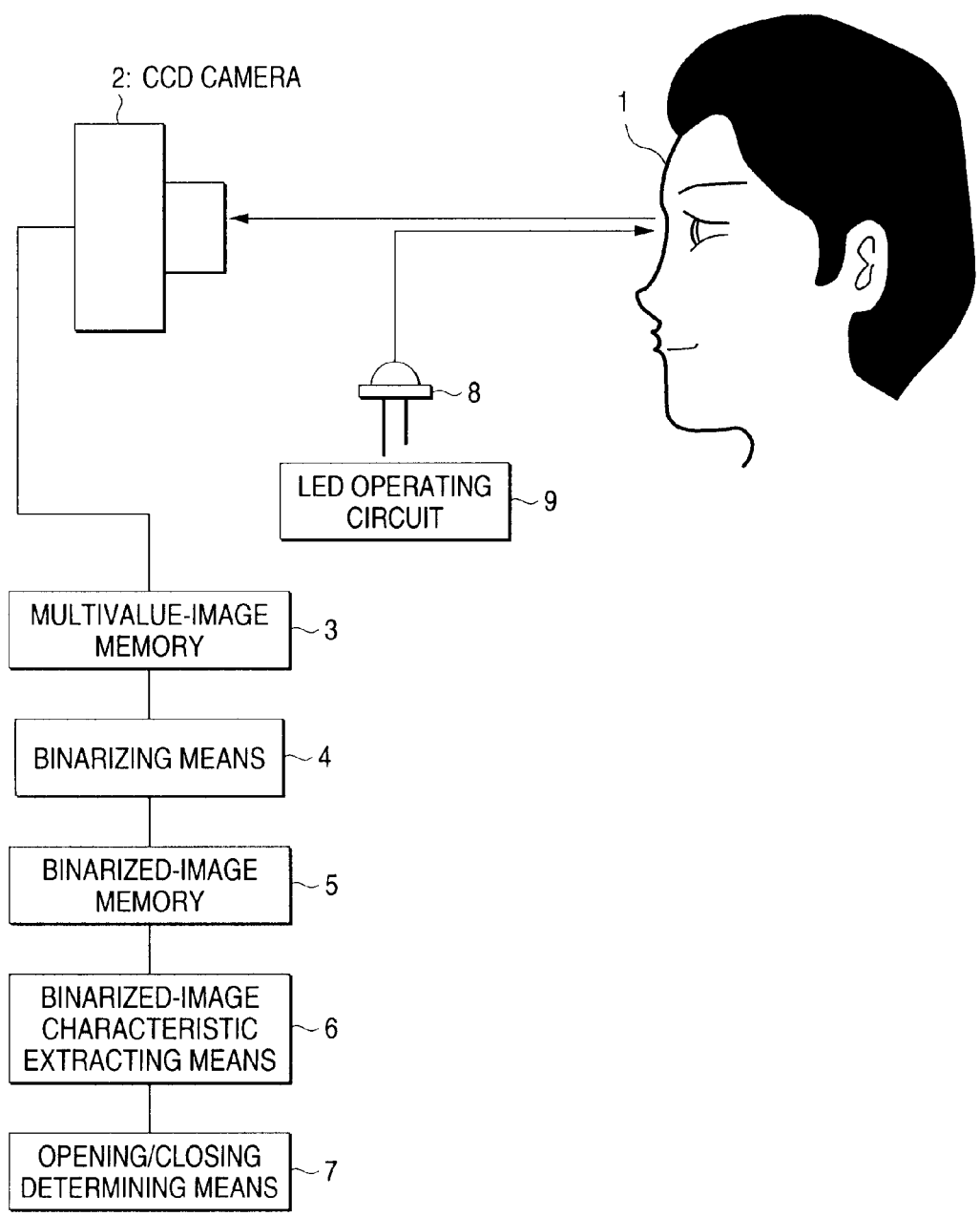
FIG. 7 is a schematic view showing the structure of a conventional apparatus for detecting a state of the eyes.

FIG. 6 shows a flow chart of an algorithm of the filter process of the face-image processing apparatus according to a second embodiment of the present invention.

The operation will now be described.

FIGS. 5A to 5C are diagrams showing a process of the one-dimensional filter incorporating a dedicated hardware PLD 25. As shown in FIG. 5C, input of one pixel to the PLD 25 is performed sequentially. Pixels 0 to 10 indicate brightness sequentially input from REFDATA. The process in the PLD 25 is performed such that pixels 2 and 4 are subjected to a comparison. Thus, a pixel having lower brightness is survived. Similarly, pixels 6 and 8 are subjected to a comparison so as to survive a pixel having lower reflection. Thus, a tournament method is performed as described above so that lowest brightness among eight data items is obtained to output the lowest brightness to a MMDATA 8. Although the foregoing lowest brightness is the lowest brightness among 8 pixels located every other pixel, the foregoing brightness is assumed to be the lowest brightness among 10 pixels. The brightness of pixel 0 is output to REFDATAP.

A process will now be described with reference to FIG. 5B.

Assuming that the point of interest is located at the position 10 shown in FIG. 5C, MMDATA 8 which is output from the PLD indicates the lowest brightness in the object range in front of the point of interest. Since the point of interest is located at the position 10, the brightness of the point of interest can directly be read from the multivalue-image memory. If the brightness of the point of interest and the lowest brightness satisfy the filter pass conditions, a flag is turned on to which a reference is made when the point of interest is brought to the position 0.

Assuming that the point of interest is located at the position 0 shown in FIG. 5C, MMDATA 8 which is the output from the PLD indicates the lowest brightness in an object range in the rear of the point of interest. When the brightness of the point of interest and the lowest brightness satisfy the filter pass conditions and the flag has been turned on, the point of interest is the filter pass pixel.

As described above, a reference is made to one output from the PLD 25 indicating the lowest brightness as the lowest brightness of the forward and rearward object ranges. Therefore, a high speed algorithm can be realized.

A flow chart of the one-dimensional filter shown in FIG. 6 will now be described.

In step S10 input of REFDATA is performed as the input to the PLD 25 such that 10 pixels are input previously. Therefore, the multivalue-image memory is brought to an advanced state by 10 pixels as compared with the binarized-image memory which stores a result of the process. The process of the position 0 of the point of interest and that of the position 10 of the point of interest correspond to steps S11 and step S16, respectively.

In step S12 a reference is made to the flag turned on in step S18. If the flag has been turned on, a determination is made in step S13 whether or not brightness REFDATAP at the position 0 of the point of interest and lowest brightness MMDATA 8 in the rear object range satisfy the filter pass conditions. If the filter pass conditions are satisfied, the brightness in the binarized-image memory is rewritten in step S14. Thus, the result of the process is stored. In step S15 the address in the multivalue-image memory and that in the binarized-image memory is incremented. In step S17 a determination is made whether or not the brightness REFDATA at the position 10 of the point of interest and the brightness MMDATA 8 in the previous object range satisfy the filter pass conditions. If the filter pass conditions are satisfied, a flag is turned on in step S18. If the filter pass conditions are not satisfied, the flag is turned off in step S19.

In step S20 the brightness which is input from the multivalue-image memory to the PLD 25 is input to the REFDATA. Then, the operation is returned to step S12.

The present invention structured as described above attains the following effects.

The apparatus comprises: the image input means for inputting a multivalue face image which is expressed by a multiplicity of pixels disposed in a matrix configuration; the multivalue-image characteristic extracting means for extracting a binarized eye region from the multivalue face image input by the image input means; and the opening/closing determining means for determining opening/closing of the eyes in accordance with the eye region extracted by the multivalue-image characteristic extracting means. Therefore, opening/closing of the eyes can correctly be determined.

The apparatus comprises: the image input means for inputting a multivalue face image which is expressed by a multiplicity of pixels disposed in a matrix configuration; the multivalue-image characteristic extracting means for extracting an eye region from the multivalue face image input by the image input means; and the opening/closing determining means for determining opening/closing of the eyes in accordance with the eye region extracted by the multivalue-image characteristic extracting means. Therefore, opening/closing of the eyes can correctly be determined.

The multivalue-image characteristic extracting means extracts a pixel of interest in accordance with distribution of relative brightness of the brightness of the pixel of interest contained in the multivalue face image and the brightness of pixels adjacent to the pixel of interest so as to extract an eye region by using the extracted pixel of interest. Therefore, the eye region can accurately be extracted.

The apparatus further comprises the extracted-image storing means for storing the extracted pixel of interest, wherein the extraction of the eye region is performed by the multivalue-image characteristic extracting means by using the pixel of interest stored in the extracted-image storing means. Therefore, extract of the eye region can efficiently be performed.

Since the extraction of the eye region is performed by the multivalue-image characteristic extracting means in accordance with distribution of relative brightness in one direction, the processing speed can be lowered.

Since the distribution of the relative brightness in one direction is the horizontal direction of the face, exertion of influences of the eyebrows and eyelids can be prevented. Thus, extraction error can be prevented. Since the one-dimensional extracting filter in only one direction is used, time required to complete the process can be shortened.

Since the extraction of the pixel of interest in accordance with the distribution of the relative brightness is performed by dedicated hardware, a high-speed algorithm can be realized.

Since the eye region includes an image reflected by the retina, opening/closing can reliably be determined.

What is claimed is:

1. A face-image processing apparatus comprising:
    image input means for inputting a multivalue face image that expresses a brightness of a pixel disposed in a matrix configuration by multivalue;
    multivalue-image characteristic extracting means for extracting an eye region from the multivalue face image input by said image input means; and
    opening/closing determining means for determining opening/closing of the eyes in accordance with the eye region extracted by said multivalue-image characteristic extracting means, wherein
    said multivalue-image characteristic extracting means extracts the eye region by a one-dimensional filter process,
    wherein the limits of an object range are set to the front of and behind a point of interest in a scan direction,
    wherein the filter permits filter pass of the point of interest when (a) a brightness difference between the value of the point of lowest brightness within the limits of the object range and the value of the point of interest is not lower than a first threshold value, (b) said brightness difference is not greater than a second threshold value, and (c) said value of the point of lowest brightness is not greater than a third threshold value.

2. The face-image processing apparatus according to claim 1, wherein said multivalue-image characteristic extracting means extracts a pixel of interest in accordance with distribution of relative brightness of the brightness of the pixel of interest contained in the multivalue face image and the brightness of pixels adjacent to the pixel of interest so as to extract an eye region by using the extracted pixel of interest.

3. The face-image processing apparatus according to claim 2, further comprising:

extracted-image storing means for scoring the extracted pixel of interest, wherein said multivalue-image characteristic extracting means performs the extraction of the eye region by using the pixel of interest stored in said extracted-image storing means.

4. The face-image processing apparatus according to claim 2, wherein said multivalue-image characteristic extracting means performs the extraction of the eye region in accordance with distribution of relative brightness in one direction.

5. The face-image processing apparatus according to claim 4, wherein the distribution of the relative brightness in one direction is the horizontal direction of the face.

6. The face-image processing apparatus according to claim 4, further comprising:

dedicated hardware which performs the extraction of the pixel of interest in accordance with the distribution of the relative brightness.

7. The face-image processing apparatus according to claim 1, wherein the eye region includes an image reflected by the retina.

* * * * *